US006622572B2

United States Patent
Kobayashi et al.

(10) Patent No.: US 6,622,572 B2
(45) Date of Patent: Sep. 23, 2003

(54) ULTRASONIC FLOWMETER FOR CONTROLLING THE GAIN OF AN AMPLIFIER FOR AMPLIFYING RECEIVED SIGNALS

(75) Inventors: Tamotsu Kobayashi, Yokohama (JP); Kunikazu Shigeta, Hachioji (JP); Toru Fujii, Tokyo (JP)

(73) Assignee: Tokyo Keiso Kabushiki-Kaisha, Tokyo (JP)

( * ) Notice: Subject to any disclaimer, the term of this patent is extended or adjusted under 35 U.S.C. 154(b) by 0 days.

(21) Appl. No.: 10/097,128

(22) Filed: Mar. 14, 2002

(65) Prior Publication Data

US 2002/0148302 A1 Oct. 17, 2002

(30) Foreign Application Priority Data

Apr. 2, 2001 (JP) .................... 2001-103757

(51) Int. Cl.[7] ................................. G01F 1/66
(52) U.S. Cl. .................................. 73/861.29
(58) Field of Search .................. 73/861.29, 861.28, 73/861.27, 861.23

(56) References Cited

U.S. PATENT DOCUMENTS 4,138,879 A * 2/1979 Liebermann ............... 73/19.03
5,503,035 A * 4/1996 Itoh et al. .................. 73/861.23

FOREIGN PATENT DOCUMENTS

EP          1211488 A2 * 6/2002 ............. G01F/1/66

* cited by examiner

*Primary Examiner*—Edward Lefkowitz
*Assistant Examiner*—Takisha S Miller
(74) *Attorney, Agent, or Firm*—Israel Gopstein

(57) ABSTRACT

The amplifying gain is controlled by means of a data reduction equipment on the basis of the control signal input into the amplifier for amplifying the received signal propagated through the fluid and received in the ultrasonic transducer in the receiving side. The data reduction equipment includes an analog-digital converter, a processor, and a memory, wherein converted into digital data are waveform data including a peak value of each of the received signals, and the obtained digital data are stored in the memory. The processor screens the peak values stored in the memory to obtain a screened peak value achieved on the fluid including no impurities such as bubbles or solid particles, compares the obtained peak value with the preset peak value set preliminary on the processor, sends a control signal to the gain control terminal of the amplifier on the basis of the result of the comparison, and controls the peak value included in the output signal of the amplifier so as to take the substantially equal value as that of the preset value of the peak.

8 Claims, 4 Drawing Sheets

ULTRASONIC FLOWMETER FOR CONTROLLING THE GAIN OF AN AMPLIFIER FOR AMPLIFYING RECEIVED SIGNALS

BACKGROUND OF THE INVENTION

1. Technical Field

The present invention relates to an ultrasonic flowmeter improved in its system for controlling the gain of the amplifier for amplifying the received signals.

2. Description of the Prior Art

The arrangement of an ultrasonic flowmeter of the prior art and the system for controlling the gain thereof will now be described with reference to FIG. 4.

A pair of ultrasonic transducers 2a and 2b are provided on both ends of a straight section 1a of a flow tube 1 including a fluid inlet 1b and a fluid outlet 1c extending vertically from the ends of the straight section 1a.

A switching device 3 is provided between either of the ultrasonic transducers 2a and 2b and either of an excitation pulse generator 4 and an amplifier 5 receiving the signal from one of the transducers. The switching device 3 delivers pulses from the excitation pulse generator 4 to one of the transducers and receives signals from the other of the transducers and delivers the signals to the amplifier 5 and vice versa. The signal for causing the switching is not described herein.

The amplifier 5 has an input terminal 5a, an output terminal 5b, and a gain control terminal 5c for controlling the amplifying gain.

The data reduction equipment 6 of the prior art has a flow measuring section 6a in which the signals delivered from the amplifier 5 are processed to obtain the flow rate output. The flow rate measuring system such as a system of a transit-time difference type or a system of a phase difference type is known. No description thereon will be made herein.

The element denoted by the reference numeral 7 is adapted to be a peak detection circuit including, for example, a peak rectifier diode 7a and a smoothing capacitor 7b, etc.

The output of the peak detection circuit 7 is sent to gain controlling section 6b, and compared with a peak value preset in the controlling section 6b. On the basis of the result obtained, the voltage to be delivered to the gain control terminal 5c of the amplifier 5 is controlled to keep consistent a magnitude of the received signal.

However the following technical problems are still present in the system for controlling the gain of the prior art.

In the case that impurities such as bubbles are included in the measured fluid, the amplitude of the received signal tends to attenuate by the presence of the bubbles, so that the magnitude of the received signal is varied as shown in FIG. 5. In FIG. 5, the received waveform with no interference from bubbles is illustrated by a solid line, while the waveform attenuated by the effect of the bubbles is illustrated by a broken line. The peak values P included in the received waveform are decreased or eliminated with the passage of time as shown in FIG. 6.

In the gain control system of the prior art, the peak values are apt to be varied under the effect of the bubbles mixed with the fluid to be measured. In other words, the gain controlling signals are also varied under the effect of so called hunting phenomena, i.e. the waveform is saturated by excessive gain to make the received signal unstable.

While the gain is fixed in a certain value for avoiding the above-mentioned saturation of the waveform, sometimes the received signal is low depending on the species or the temperature of the fluid. In such case, the measurement should be made under the low S/N condition.

In the ultrasonic flowmeter of the prior art, systems are known for finding the flow rate from the received signals independently of the magnitude of the signals such as systems of the zero-cross type, the correlation type, or the phase differential type. These systems are advantageous when the received signals are tend to vary by the effect of bubbles included in the fluid. However, when the received waveform is unstable, it is difficult to measure the flow rate stably and precisely even if the above-mentioned systems are adopted.

SUMMARY OF THE INVENTION

In order to solve the above mentioned problem, the first ultrasonic flowmeter of the present invention comprises:

a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal representing the ultrasonic waves propagating through the fluid received by the ultrasonic transducer of the receiving side, and a data reduction equipment for processing the amplified received signal to output a flow rate signal;

the amplifier includes an amplification gain control terminal, wherein an amplification gain is adapted to be adjusted on the basis of the control signal input into the terminal;

said data reduction equipment includes an analog-digital converter, a processor, and a memory, wherein converted into digital data are waveform data comprising analog data including a peak value of each of the received signals generated together with a plurality of transmission and reception, and the obtained digital data are stored in the memory;

the processor screens the peak values stored in the memory to obtain a screened peak value achieved on the fluid including no impurities such as bubbles or solid particles, compares the obtained peak value with the preset peak value set preliminary on the processor, sends a control signal to the gain control terminal of the amplifier on the basis of the result of the comparison, and controls the peak value included in the output signal of the amplifier so as to take the substantially equal value as that of the preset value of the peak.

According to the first embodiment, said screened peak value is the highest peak among the peaks included within the predetermined time interval.

According to the second embodiment, said screened peak value is the highest peak among the peaks included within the predetermined time interval, and values of the waveform data thereof will satisfy the requirements of the received waveform.

A second ultrasonic flowmeter of the present invention comprises:

a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal representing the ultrasonic waves propagating through the fluid received by the ultrasonic transducer of the receiving side, and a data reduction equipment for processing the amplified received signal to output a flow rate signal;

the amplifier includes an amplification gain control terminal, wherein an amplification gain is adapted to be adjusted on the basis of the control signal input into the terminal;

said data reduction equipment includes an analog-digital converter, a processor, and a memory, wherein converted into digital data are waveform data comprising analog data including a peak value of each of the received signals generated together with a plurality of transmission and reception, and the obtained digital data are stored in the memory;

the processor calculates the amount of variation through comparing the peak value of the predetermined time interval with the peak value of the preceding time interval, and provided that the amount of variation does not exceed the predetermined threshold value, the peak value obtained in the present time interval is further compared with a preset peak value, and a control signal is sent to the gain control terminal of the amplifier on the basis of the result of the comparison, and the peak value included in the output signal of the amplifier is controlled so as to take the substantially equal value as that of the preset value of the peak, and on the other hand provided that the amount of variation does exceed the predetermined threshold value, the gain control operation of the amplifier is interrupted.

According to the third embodiment, the rates of increasing and decreasing of the gain are differentiated by the processor upon gain controlling operation of the amplifier.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

The arrangement of the first ultrasonic flowmeter of the present invention and the system for controlling the gain thereof will now be described with reference to FIG. 1.

Figure 4:
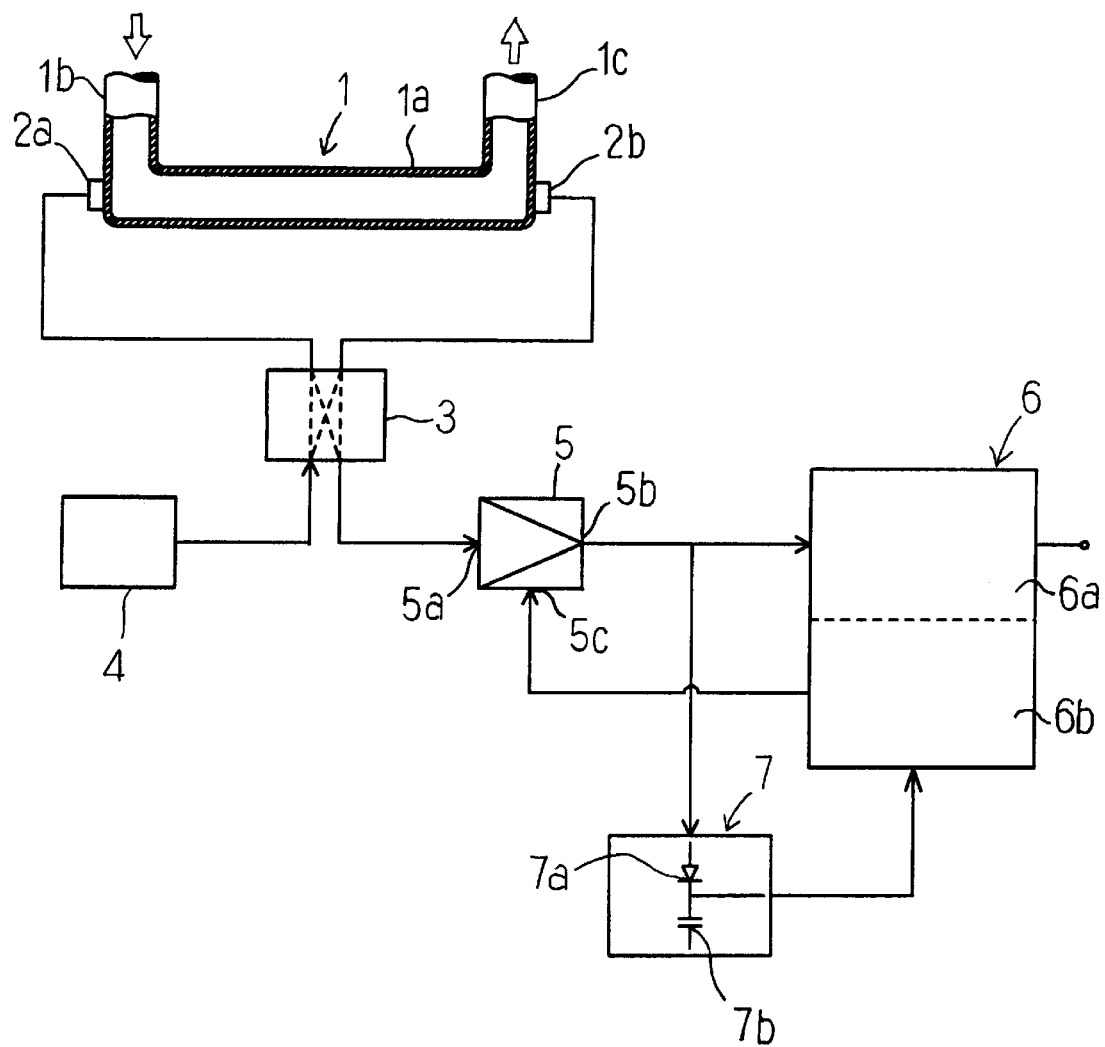
FIG. 4 is a schematic partially broken view showing the general arrangement of the ultrasonic flowmeter of the prior art and the system for controlling the gain thereof.
Figure 5:
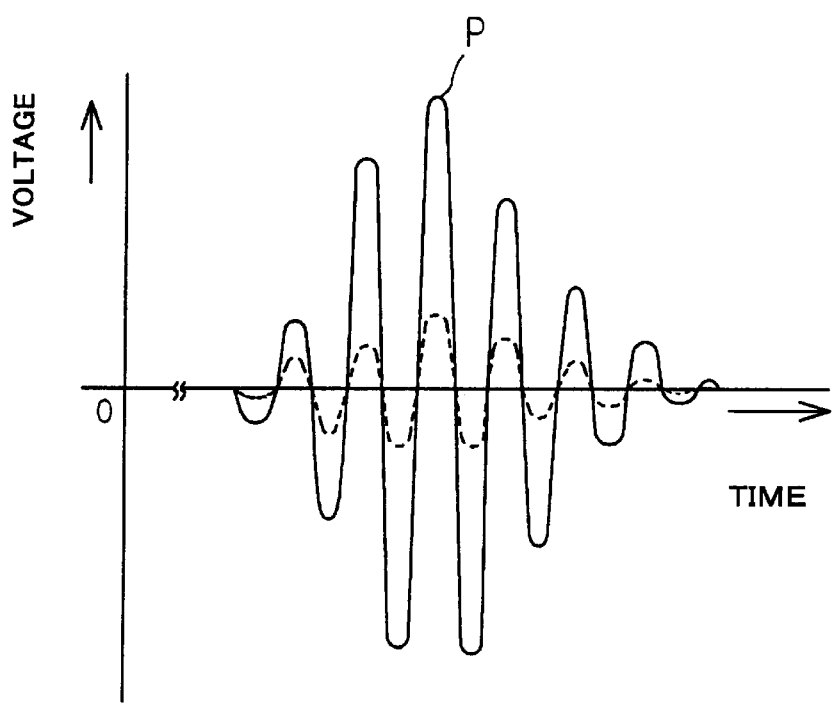
FIG. 5 is a graph showing the received waveform obtained through the system for controlling the gain employed in the ultrasonic flowmeter of the prior art.
Figure 6:
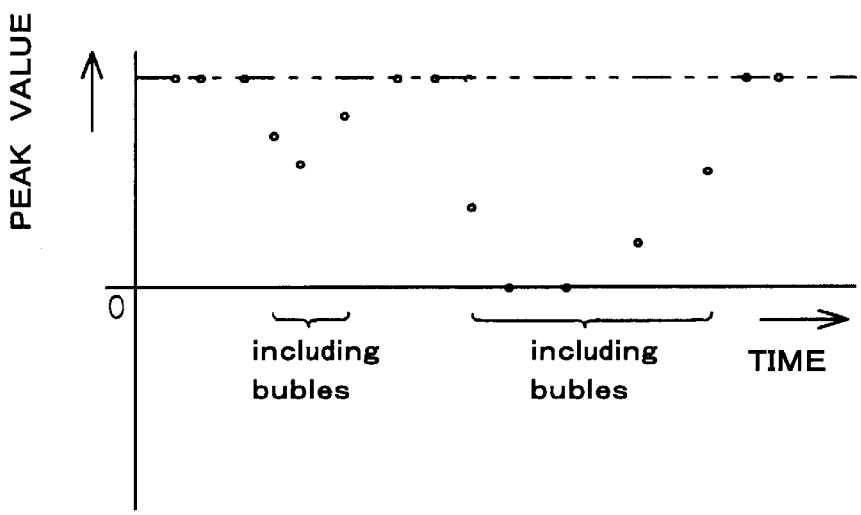
FIG. 6 is a graph showing the peak values obtained through the system for controlling the gain employed in the ultrasonic flowmeter of the prior art.

Those elements denoted in this figure by reference numerals 1–5 are identical with corresponding elements of the prior art designated on FIG. 4 so that no descriptions are made thereon.

The data reduction equipment 8 of the present invention includes an analog—digital converter hereinafter referred to as ADC) 9 of a sampling rate of several 10 MS/s and a resolution of 10–12 bits, a processor (hereinafter referred to as CPU) 10 of a clock frequency of several 10 MHz, and a memory 11. The waveform received and amplified by the amplifier 5 is processed by the data reduction equipment 8 to provide signals indicating a flow rate. The gain achieved in the amplifier 5 can be controlled in an appropriate manner through the data reduction equipment 8 in spite of impurities such as bubbles or solid particles included in the fluid to be measured.

The received signals (analog signals) obtained from either of the ultrasonic transducers 2a or 2b on the received side through the switching device 3 and the amplifier 5 and delivered to the data reduction equipment 8 are sampled by the ADC 9, converted into the voltage—time digital data set, and stored in the memory.

The CPU 10 processes the obtained digital data by means of the system of either of the zero-cross type, the correlation type, or the phase difference type, and outputs the flow rate signals. However, the manner in which the processing operation is effected is not described herein detail.

The CPU 10 picks up waveform data including one or more peak values P from the memory 11 in parallel with proceeding the above mentioned processing step. A peak value of a waveform datum obtained on the fluid containing no bubbles is to be defined as a screened peak value by the means of the first or the second embodiment as mentioned hereinbelow. The screened peak value is compared with the peak values preset on the CPU 10. Depending upon whether the result obtained by such comparison is negative or positive, the amplifier 5 is controlled in analog or digital form by delivering the gain control signal to the gain control terminal 5c of the amplifier. The gain will thus be modified or controlled. The magnitude of the amount of the amplification of the gain is, for example, 1–2 dB.

The difference between the above mentioned gain control system and the closed loop control system will now be described. Generally, in the closed loop control system, the present value of the controlled amount is measured, and control is made to reduce the difference between the present value and the preset value. However, when the present value of the controlled amount is attenuated by the presence of bubbles, the gain control system employed in the ultrasonic flowmeter is required to make the screening operation on the peak values. This is the difference between the gain control system and the closed loop control system.

In the control operation effected in the present embodiment, the closed loop situation is adapted to be maintained until the next time interval is reached. However, in the ultrasonic flowmeter adopting a system of the zero-cross type, the correlation type, or the phase differential type, the flow rate can be measured independently of the magnitude of the received signals output from the amplifier 5, so that substantially no problem will arise even if the value of the peak included within the received signal output from the amplifier does not correspond exactly with the preset value of the peak.

Further, in the control of the present embodiment, the peak value of the received signal obtained through the fluid with no bubbles will gradually reach the preset value, since the closed loop control will finally be achieved.

In the present embodiment, dead zones may be set under and over the predetermined range of the preset value of the peak. If the value of the screened peak is included within the range defined by the dead zones, It may be possible not to modify the value of the gain. It is necessary to determine the time interval so as to include at least one peak value has no influence of the bubbles.

Although the said time interval may in general be defined periodically by means of the timer, the on-demand defining of the time interval can also be effected in response to the determination of the operator. In such a case, the CPU 10 recognizes the push on operation of the button by the operator, and then repeats the above-mentioned gain control action by predetermined numbers, and finally terminates the control operation.

The First Embodiment

The first embodiment is the most practicable method that is applicable to the circumstance good for the measurement. In such method, the maximum value of the peak values present on the predetermined time interval is regarded as a peak value obtained through the fluid with no bubbles.

The CPU compares the adjacent peak values present in the predetermined time interval with each other and selects the relatively larger one. After all peaks are compared, the peak or maximum value in the time interval will be obtained. The obtained maximum value is stored as the screened peak value, and compared with the preset peak value. The steps to be effected in succession are the same as those described above.

Generally, the switching operation of the switch 3 has substantially no influence on the peak value P. Further, the peak value P has substantially no opportunities for attenuation while a little or no bubbles are included in the fluid. Thus a plurality of substantially uniform data is obtained as maximum values. In this connection, the stable and correct measurement can be made by selecting the screened peak value among the data in a suitable screening precision and make gain control on the basis thereon.

The Second Embodiment

The second embodiment is an effective method to be applied on the circumstances flooded with extrinsic electric noises. The peak higher in its voltage than the other plurality of peak values within the predetermined time interval is a screened peak. The data of waveform including the screened peak must satisfy the requirement of the received signal.

Figure 2:
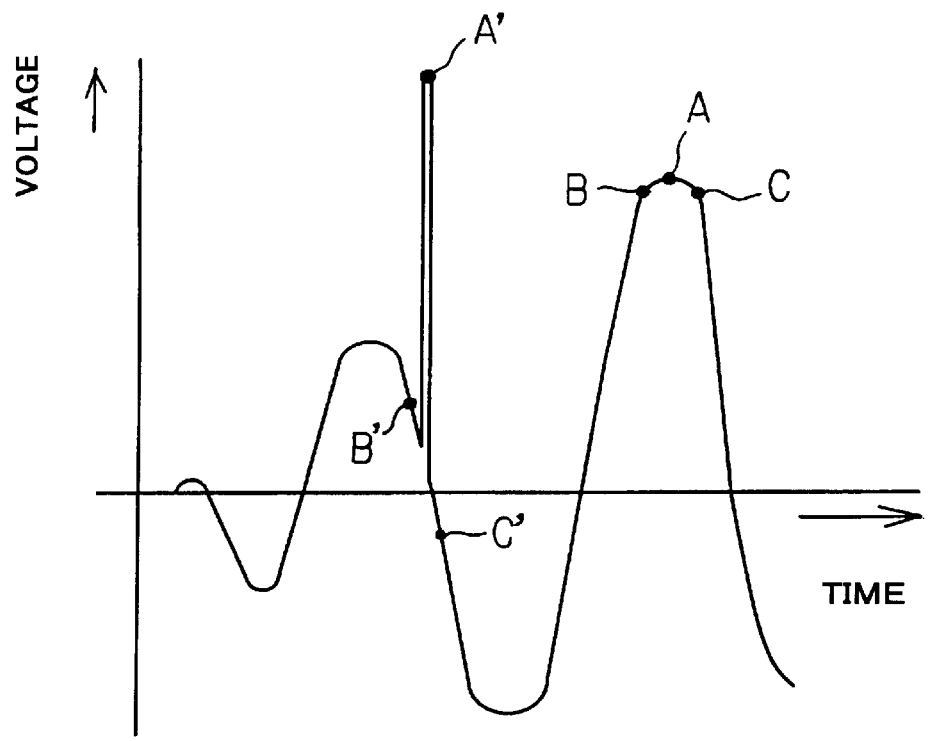
FIG. 2 is a graph showing the received waveform including noise for illustrating the second embodiment of the present invention.

The extrinsic electric noise generally has a waveform as shown in FIG. 2 by A', so that the noise scarcely be generated in synchronous with the sampling time of the ADC. Assumed that the noise is generated in synchronous with the sampling time, it can be determined easily from the waveform data across the time that the datum of the noise does not satisfy the requirement of the received waveform.

In other words, and as will be appreciated from FIG. 2, the magnitudes of the voltages B and C adjacent in time to the peak A of the received waveform are close to the magnitude of the voltage of the peak A and may form a quasi-sine wave therewith, whereas voltages B' and C' adjacent in time of to the noise peak A' are substantially different from that of the noise peak A'.

As can be seen from the above, such noise data can be eliminated easily by suitably defining the condition of the received waveform so that the system of the gain control type of the present invention cannot be affected by such noises.

The system of the second gain control type of the ultrasonic flowmeter of the present invention will now be described.

Figure 1:
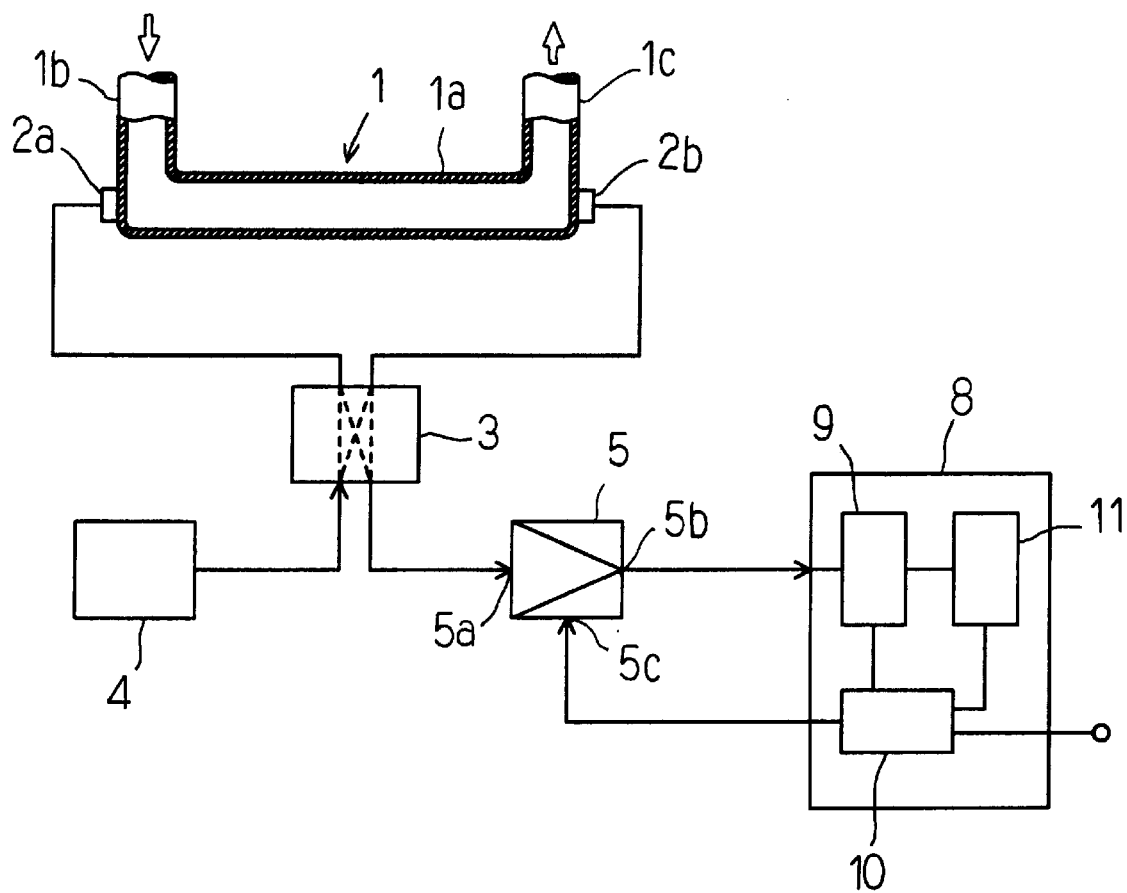
FIG. 1 is a schematic partially broken view showing the general arrangement of the ultrasonic flowmeter according to the present invention and the system for controlling the gain thereof.

The system of the second gain control type has an arrangement substantially the same as that employed in the flowmeter of the first gain control type as shown in FIG. 1. In this connection the descriptions thereon is omitted.

In the system of the second gain control type, the CPU 10 calculate the variation between the value of the peak of the predetermined time interval and the value of the peak of the preceding time interval. If the amount of variation does not exceed the predetermined threshold value, it is determined that the fluid does not include bubbles, and the peak value obtained in this time is compared with the peak value preset on the CPU, and the gain of the amplifier 5 is controlled accordingly.

Whereas if the above-mentioned amount of variation exceeds the predetermined threshold value, it is determined that the fluid does include bubbles, and the gain control operation of the amplifier is interrupted so as not to alternate the gain of the amplifier to suppress the control error due to bubbles. If it is determined in the next time interval that the fluid includes no bubbles, the gain control operation will be resumed. In conclusion, the system of the second gain control type can cope with the gradual variation of the temperature and/or the species of the fluid to be measured without occurring the control error.

The Third Embodiment

The third embodiment represent an example of the control operation of the amplified gain of the amplifier 5 employed in the systems of the first and the second gain control type of the ultrasonic transducers according to the present invention. In this embodiment, the rates of increasing and decreasing of the gain are differentiated upon controlling the gain of the amplifier.

Generally in the flow rate measuring system independent of the magnitude of the received signal, the information on the waveform is utilized, so that the substantial variation of the received waveform is not preferable in view of ascertaining the waveform saturation. The term "waveform saturation" means the situation in which the waveform exceeds the limits of measurement.

When the output from the detector is decreased due to the drop of the temperature of the liquid, and thus it become necessary to increase the gain of the amplifier 5, the gain increasing rate is delayed so as not to get into the saturation region. Upon the gain gets into the saturation region, the gain is decreased rapidly.

When it is intended to increase the gain, the amount of the variation of the gain is about 1–2 dB for the predetermined time interval, whereas when it is intended to decrease the gain, the amount of the variation of the gain is for about few dBs larger than that varied upon increasing the gain. In the other method, the time interval for control upon increasing the gain can be several times of that upon decreased.

The Fourth Embodiment

Figure 3:
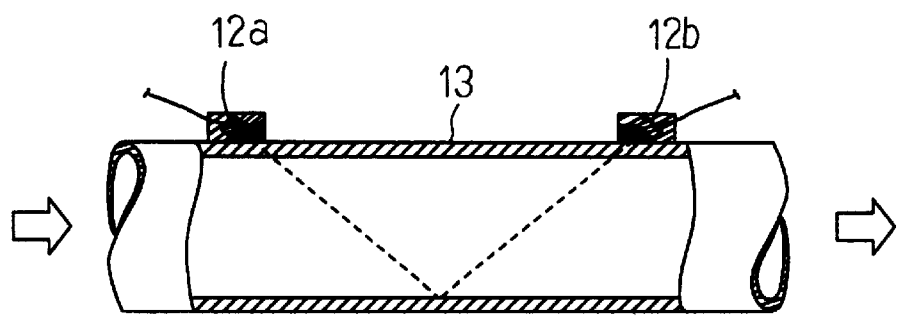
FIG. 3 is a schematic partially broken view showing the arrangement of another detecting section according to the present invention.

In the arrangement of the detecting portion of the ultrasonic flowmeter of the present invention to which the system of the above-mentioned gain control type is applied, a pair of ultrasonic transducers 2a, 2b are provided on both end of the straight tube 1a of the flow tube 1 as shown in FIG. 1. Further, the arrangement so called clamp-on type in which the ultrasonic transducers 12a and 12b are provided around the straight tube of the flow tube 13 as shown in FIG. 3 can also be adopted. In which case, the detecting portion arranged as shown in FIG. 1 can also be applied equally, and good results can be obtained therefrom.

Although in the arrangement shown in FIG. 3, the ultrasonic transducers 12a and 12b are provided on the same side on the flow tube 13 (on the upper side in FIG. 3), the transducers can also be provided on the opposite sides of the flow tube.

Advantages or Effects to be Obtained

According to the system of the gain control type of the ultrasonic flowmeter of the present invention, the gain of the amplifier can suitably be controlled in spite of the impurities such as bubbles included in the fluid, and the flow rate can be measured in high S/N ratio even if the temperature and/or the species of the fluid to be measured is varied. In conclusion, the ultrasonic flowmeter of the present invention can measure the flow rate consistently accurately and stably.

While particular embodiments of the present invention have been illustrated and described, it should be obvious to those skilled in the art that various changes and modifications can be made without departing from the spirit and scope of the invention.

What is claimed is:

1. An ultrasonic flowmeter comprising:
   (a) a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal received by the ultrasonic transducer of the receiving side and representing the ultrasonic waves propagating through the fluid, and a data reduction equipment for processing the amplified received signal to output a flow rate signal;
   (b) the amplifier including an amplification gain control terminal, wherein an amplification gain is adjusted on the basis of a control signal input into the terminal;
   (c) said data reduction equipment including an analog-digital converter, a processor, and a memory, wherein waveform data are converted into digital data: the waveform data, comprising analog data including a peak value of each of the received signals generated together with a plurality of transmission and reception, and the obtained digital data are stored in the memory;
   (d) wherein said processor screens the peak values stored in the memory to obtain as an attenuation free peak the value achieved on the fluid without impurities, compares the obtained peak value with a preset peak value preliminarily set in the processor, sends a control signal to the gain control terminal of the amplifier on the basis of the result of the comparison, and controls the peak value included in the output signal of the amplifier so as to take a substantially equal value as that of the preset value of the peak.

2. The ultrasonic flowmeter according to claim 1, characterized in that said attenuation free peak value is the highest peak among the peaks included within the predetermined time interval.

3. The ultrasonic flowmeter according to claim 1, characterized in that said attenuation free peak value is the highest peak among peaks included within a predetermined time interval, and the values of the waveform data of points time-wise adjacent to the peak will be close enough to form a quasi-sine wave form peak.

4. An ultrasonic flowmeter comprising:
   (a) a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal received by the ultrasonic transducer of the receiving side and representing the ultrasonic waves propagating through the fluid, and a data reduction equipment for processing the amplified received signal to output a flow rate signal;
   (b) the amplifier including an amplification gain control terminal, wherein an amplification gain is adjusted on the basis of a control signal input into the terminal;
   (c) said data reduction equipment including an analog-digital converter, a processor, and a memory, wherein waveform data are converted into digital data the waveform data, comprising analog data including a peak value of each of the received signals generated together with a plurality of transmission and reception, and the obtained digital data are stored in the memory;
   (d) wherein the processor calculates an amount of variation by comparing the peak value of a present predetermined time interval with the peak value of a preceding time interval, and
      provided that the amount of variation does not exceed a predetermined threshold value, the peak value obtained in the present time interval is further compared with a preset peak value, and a control signal is sent to the gain control terminal of the amplifier on the basis of the result of the comparison, to control the peak value included in the output signal of the amplifier to take a value substantially equal to the preset value of the peak, and
      provided that the amount of variation exceeds the predetermined threshold value, the gain control operation of the amplifier is interrupted.

5. The ultrasonic flowmeter according to claim 1, characterized in that the amplification gain is adjusted in increasing and decreasing directions, wherein rates of increasing and decreasing of the gain are differentiated by the processor upon gain controlling operation of the amplifier.

6. The ultrasonic flowmeter according to claim 2, characterized in that the amplification gain is adjusted in increasing and decreasing directions, wherein rates of increasing and decreasing of the gain are differentiated by the processor upon gain controlling operation of the amplifier.

7. The ultrasonic flowmeter according to claim 3, characterized in that the amplification gain is adjusted in increasing and decreasing directions, wherein rates of increasing and decreasing of the gain are differentiated by the processor upon gain controlling operation of the amplifier.

8. The ultrasonic flowmeter according to claim 4, characterized in that the amplification gain is adjusted in increasing and decreasing directions, wherein rates of increasing and decreasing of the gain are differentiated by the processor upon gain controlling operation of the amplifier.

* * * * *